United States Patent [19]

Katz et al.

[11] Patent Number: 5,234,702
[45] Date of Patent: Aug. 10, 1993

[54] ANTIOXIDANT SYSTEM FOR POWDERED NUTRITIONAL PRODUCTS

[75] Inventors: Gary E. Katz, Columbus; Melinda Guzman-Harty, Gahanna, both of Ohio

[73] Assignee: Abbott Laboratories, Abbott Park, Ill.

[21] Appl. No.: 854,099

[22] Filed: Mar. 19, 1992

[51] Int. Cl.$^5$ .................................... A23L 1/303
[52] U.S. Cl. .................................. 426/72; 426/73; 426/311; 426/541; 426/801
[58] Field of Search ............... 426/72, 73, 311, 541, 426/801

[56] References Cited

U.S. PATENT DOCUMENTS

| | | | |
|---|---|---|---|
| 2,307,756 | 1/1943 | Blaso | 426/311 |
| 2,855,306 | 10/1958 | Rosenberg | 426/72 |
| 3,998,753 | 12/1976 | Antoshkiw | 426/541 |
| 4,966,779 | 10/1990 | Kirk | 426/73 |
| 5,023,095 | 6/1991 | Kirk | 426/72 |
| 5,043,180 | 8/1991 | Haring | 426/541 |
| 5,077,069 | 12/1991 | Chang | 426/541 |
| 5,079,016 | 1/1992 | Tood | 426/541 |
| 5,084,289 | 1/1992 | Shin | 426/541 |
| 5,084,293 | 1/1992 | Todd | 426/541 |
| 5,153,012 | 10/1992 | Ohtaka | 426/72 |

FOREIGN PATENT DOCUMENTS

| | | | |
|---|---|---|---|
| 0198804 | 10/1986 | European Pat. Off. | 426/72 |
| 2202726 | 10/1986 | European Pat. Off. | 426/73 |
| 54-155205 | 12/1979 | Japan | 426/541 |
| 57-143398 | 9/1982 | Japan | 426/311 |
| 60-102169 | 6/1985 | Japan | 426/311 |

OTHER PUBLICATIONS

Dougherty The Effectiveness of Natural Antioxidants Compared to Synthetic Antioxidants.

*Primary Examiner*—Carolyn Paden
*Attorney, Agent, or Firm*—Lonnie R. Drayer; Donald O. Nickey

[57] ABSTRACT

A powdered nutritional product has an oil blend which contains soy oil and/or marine oil. In order to minimize oxidation of the product an antioxidant system of natural ingredients is incorporated therein. The antioxidant system is made up of ascorbyl palmitate, beta carotene and/or mixed tocopherols, and citrate.

18 Claims, No Drawings

ANTIOXIDANT SYSTEM FOR POWDERED NUTRITIONAL PRODUCTS

FIELD OF THE INVENTION

The present invention relates to a method of incorporating an antioxidant system into a powdered nutritional product and to powdered nutritional products which contain an antioxidant system.

BACKGROUND OF THE INVENTION

Linolenic acid (18:3-omega 3) is the most common fatty acid in the class of polyunsaturated fatty acids known as omega-3 fatty acids. While there is no consistent clinical data as to whether omega-3 fatty acids are a dietary essential for human infants, it is known that human milk does contain linolenic acid. Dietary deprivation of omega-3 fatty acids in growing rats and primates has been associated with visual impairment. Dietary omega-3 fatty acids may also be essential for normal prenatal and postnatal development of the retina and brain.

Linolenic acid is present in soybean, canola, and linseed oils. Attempts have been made to formulate spray dried products containing soy oil to provide linolenic acid with limited success. Exposure of the unsaturated fatty acids to heat and oxygen in the presence of catalysts like iron and copper during the spray drying process has resulted in powdered nutritional products with unacceptable sensory attributes resulting from oxidative rancidity. Oxidation reactions occur when electrons are removed from an atom or group of atoms, when oxygen is added to carboncarbon double bonds and a corresponding reduction reaction that involves the addition of electrons to an atom or group of atoms. Oxidation reactions involving unsaturated lipids result in the development of undesirable flavors and odors. In food systems, antioxidants function by being preferentially oxidized or by interrupting the freeradical chain mechanism.

Optimization of the oil blend in powdered infant formulas will result in products with fatty acid profiles which are similar to the corresponding liquid infant formulas and also closer to that of human milk. The level of oleic acid will also be optimized. Oleic acid concentrations in current formulations are considerably less than that found in human milk. Oleic acid is a precursor of C24:1, which is essential for myelination and nervous system development. The increased level of mono-unsaturated oleic acid may exhibit a protective effect on the oxidation of the more unsaturated fatty acids such as linolenic acid. Oleic acid may act as free radical scavenger and block propagation of linolenic acid oxidation.

U.S. Pat. 3,950,266 teaches antioxidant compositions of rosemary or sage which have been extracted using a particular procedure. The antioxidant property of the extract may be enhanced by the addition of ascorbic acid or citric acid. The antioxidant compositions are claimed to have utility with soybean oil, and are especially useful when the oil is subjected to elevated temperatures, as in the case of deep frying foods. There is no indication in this patent that the antioxidant compositions may have utility in a powdered food product.

U.S. Pat. No. 5,077,069 teaches a natural antioxidant system comprising tocopherols, ascorbic acid, citric acid and phospholipids. Rosemary extract may optionally be employed in this antioxidant system. The tocopherols may be supplied by a vegetable oil, such as soybean oil. The patent teaches that citric acid does not have a strong effect on antioxidant activity in fish oil, but is important in the prevention of the development of an off-color. This patent teaches that the use of ascorbyl palmitate as an antioxidant in oil is not desirable. This patent contains only examples of the use of the antioxidant system with liquid oils and not with a powdered product.

U.S. Pat. No. 4,692,340 relates to a method of improving the "keeping quality" of a powdered pediatric nutritional product by producing a sugar film around the fat in the product. The fat system suggested in this patent comprises milk fat (preferably clarified butter), vegetable fat (preferably sunflower seed oil) and lard. While this system is much different from the antioxidant blend disclosed herein, it does serve to point out that the necessity to prevent oxidation of fat sources in powdered nutritional products has been recognized as a problem for quite sometime.

Published Japanese Patent Application Hei 2-55785 (published 1990) describes an antioxidant system for storage of oils (in the liquid state) containing tocopherols, ascorbic acid, ester, and tea extracts.

Substantial development work has resulted in the successful formulation of liquid infant formulas with a modified lipid blend containing optimized levels of omega-3 fatty acids. An oil blend has been identified which provides desirable levels of oleic, linoleic, and linolneic acids in powdered infant formulas. This blend contains 28% soy oil, 42% high oleic safflower oil, and 30% coconut oil. Incorporation of polyunsaturated fatty acids into spray dried nutritional products presented the technical challenge of protecting the products from oxidation which in the past has resulted in undesirable rancidity when exposing these unsaturated oils to the heat and air involved in spray drying. In order to minimize rancidity resulting from oxidation of the unsaturated fatty acids, combinations of natural antioxidants and a chelating agent may be incorporated into a product in accordance with the present invention. Levels oflinolenic acid, linoleic acid, oleic acid and long chain omega-3 fatty acids in infant formula powders may be optimized using oil blends containing combinations of soy, canola, high oleic safflower, corn, coconut, and marine oils.

DETAILED DESCRIPTION OF THE INVENTION

Antioxidants exhibit varying degrees of efficiency in protecting food systems. Combinations of antioxidants may have a synergistic action, providing greater overall protection than can be accounted for through the simple additive effects of each antioxidant. Antioxidants which were first considered for use in a powdered infant formula containing a lipid blend included: mixed tocopherols, beta carotene, and ascorbyl palmitate. Synthetic and chemical antioxidants, such as Butylated Hydroxy Anisole (BHA) and Butylated Hydroxy Toluene (BHT), are not used in infant formulas in the U.S.A. The antioxidants which were selected for evaluation in the modified lipid blends are considered to be natural antioxidants.

Mixed tocopherols contain a mixture of alpha, beta, gamma, and delta tocopherol. The tocopherols have vitamin E activity that decreases from alpha to delta and antioxidant activity that increases from alpha to delta.

Beta carotene, as one of the most powerful singlet oxygen quenchers, can dissipate the energy of singlet oxygen, thus preventing this active molecule from generating free radicals. To a lesser extent beta carotene can also act directly as an antioxidant and scavenge free radicals generated by reactions other than those involving singlet oxygen.

Ascorbic acid reacts readily with oxygen and acts as a reducing agent, thereby serving as an oxygen scavenger. It has been theorized that ascorbic acid can regenerate phenolic antioxidants by supplying hydrogen atoms to phenoxy radicals that form when the antioxidants yield hydrogen atoms to the lipid oxidation chain reaction. In order to achieve this action in lipids, ascorbic acid must be made less polar so it can dissolve in the oil. This may be done by esterification to fatty acids to form a compound such as ascorbyl palmitate.

The presence of metallic ions, particularly copper and iron, promotes lipid oxidation through catalytic action. A technique by which metallic prooxidants are inactivated involves adding chelating agents such as citric acid. In this role, chelating agents are referred to as synergists since they greatly enhance the action of the antioxidants. Increased levels of citrate in the process mixes of powdered products were evaluated in combination with the antioxidants to determine if chelation of the metallic prooxidants, particularly iron and copper, aids in minimizing oxidative rancidity.

EXPERIMENT ONE

An experimental design was developed consisting of seventeen combinations and levels of various antioxidants and a chelating agent. Three sets of experiments were performed on non-consecutive days using the antioxidants ascorbyl palmitate (AP), alpha-tocopherol (AT), and beta-carotene (BC) in conjunction with citric acid (CA) as a chelating agent. Materials which may be used in the practice of the present invention are commercially available from the following sources, although suitable materials from any source are acceptable:

Beta Carotene 30% suspension is available from Hoffman-LaRoche, Inc.

Ascorbyl Palmitate NF, FCC is available from Hoffman-LaRoche, Inc.

Mixed tocopherols are available under the trade name TenoxGT from

Eastman Chemical Products, Inc.

Potassium Citrate crystals are available from Morton Salt Co.

The first ten combinations (Run Nos. 1-10 in Table 1) were evaluated using a procedure wherein methyl linolenate at a concentration of 7.5 mM was infused with a constant flow of air (30ml/min) for 24 hours at 45.C. Autoxidation was catalyzed with 5 ppm copper sulfate and 15 ppm ferrous sulfate. Aliquots of untreated control samples and samples of the reaction mixture containing varying combinations and concentrations of antioxidant/chelating agent were taken at $t=0$, 18 and 24 hours for peroxide value analysis. Antioxidant efficacy was calculated as the percentage of the peroxide value analysis after 24 hours (P24) to that of the 0-time value (P0).

The results obtained for the experimental design are presented in Table 1. A number of antioxidant/chelating agent combinations were successful in reducing the amount of methyl linolenate oxidation. Some combinations exhibited a prooxidant effect, increasing the peroxide value relative to the control. Alpha-tocopherol (AT), Beta-carotene (BC), and citric acid (CA) alone reduced the amount of oxidation at 24 hours, but ascorbyl palmitate (AP) by itself was not effective.

TABLE 1

| | | | | | Methyl Linolenate | | |
| --- | --- | --- | --- | --- | --- | --- | --- |
| Run # | Ascorbyl Palmitate ppm | B. Carotene ppm | Tocopherol ppm | Citrate ppm | SET 1 P24 meq* $\times 10^{-2}$ 9.2 mM | SET 2 P24 meq* $\times 10^{-2}$ 7.5 mM [14.4 mM]# | SET 3 P24 meq* $\times 10^{-2}$ 18.2 mM |
| Control | 0 | 0 | 0 | 0 | 2.5 | 1.6 | 3.1 |
| 1 | 0 | 0 | 800 | 0 | 0.4 | 0.8 | — |
| 2 | 0 | 13 | 0 | 0 | 0.1 | 0.2 [0.2] | 0.2 |
| 3 | 0 | 0 | 0 | 800 | 0.2 | — | — |
| 4 | 400 | 0 | 0 | 0 | 1.9 | 3.7 | — |
| 5 | 400 | 13 | 800 | 0 | — | 0.1 | — |
| 6 | 0 | 13 | 800 | 800 | — | 0.1 [0.1] | [0.2] |
| 7 | 400 | 13 | 0 | 800 | — | 1.5 [3.4] | 11.9 |
| 8 | 400 | 0 | 800 | 800 | — | 0.1 | — |
| 9 | 400 | 0 | 0 | 800 | — | — | 7.3 |
| 10 | 400 | 13 | 0 | 0 | — | — | 7.6 |
| 11 | 500 | 16 | 1000 | 1000 | | 0.16 | |
| 12 | 500 | 0 | 1000 | 0 | | 0.05 | |
| 13 | 250 | 8 | 1000 | 1000 | | 0.46 | |
| 14 | 500 | 8 | 500 | 1000 | | 0.05 | |
| 15 | 100 | 16 | 200 | 1000 | | 0.16 | |
| 16 | 0 | 0 | 1000 | 1000 | | 1.19 | |
| 17 | 0 | 16 | 1000 | 0 | | 0.95 | |

*P24 (meq) is the milliequivalents of peroxide formed in the aerated methyl linolenate system after 24 hours. P24 of Sets 1 and 2 are mean of duplicate values while Set 3 are single values.
— Not performed
[ ] P24 at a higher C18:3 concentration The results of Set 2 (C18:3-7.5 mM) show that the 3-component mixtures of AP+BC+AT, AP+AT+CA, and BC+AT+CA were equally antioxidative while AP+BC+CA had virtually no effect. Moreover, this set confirms that alpha-tocopherol or beta carotene used alone was antioxidative but ascorbyl palmitate was pro-oxidative (P24 is twice the level of C18:3 control). Citric acid alone was not retested since it is not very liposoluble. In addition, the antioxidant efficacy of betacarotene-containing mixtures was determined at nearly twice the substrate (C18:3 -14.4 mM) concentration. The results show that beta carotene alone or AP+BC+AT or BC+AT+CA was highly protective (reduced P24) while unexpectedly, AP+BC+CA stimulated peroxidation.

A Set 3 experiment was conducted to verify the antioxidant effect of beta carotene alone, the prooxidant effect of AP+8C+CA, and to determine the interaction of AP+BC and AP+CA at a high (C18:3) concentration of methyl linolenate. The results show that beta carotene alone is definitely antioxidative whereas AP+BC+CA and AT+BC and AP+CA are prooxidative.

To compare the relative efficacy of the different agents for the first ten combinations of the experimental design, the antioxidative response is presented as percent inhibition in Table 2. Set I experiments show beta carotene and citric acid were equipotent (greater than 90% inhibition), followed by alpha tocopherol while ascorbyl palmitate is the least inhibitory. The relative efficacy of beta-carotene, alpha-tocopherol and ascorbyl palmitate each used alone was confirmed in Set 2. The 3-component mixtures, except AP+8C+CA, inhibited C18:3 oxidation by 94%. At a higher C18:3 concentration (Set 3), beta carotene was 94% inhibitory whereas AP+BC+CA or AP+BC or AP+CA showed greater than 100% negative inhibition or prooxidation.

This first experiment (sets 1-3) was designed to screen out the effective versus the ineffective antioxidants/chelating agent. The results clearly show that on a molar basis, beta carotene alone is more antioxidative than alpha-tocopherol or citric acid alone. Ascorbyl palmitate alone is not effective but in combination with BC+AT and CA+AT produces highly potent antioxidant mixtures.

EXPERIMENT TWO

A spreadsheet program was used to formulate oil blends containing various combinations of soy, coconut, canola, corn, and high oleic safflower oils to optimize the fatty acid profile of the blend. Particular emphasis was placed on levels of oleic acid, linoleic acid, and linolenic acid. Combinations effective in reducing oxidation in the methyl linolenate system in Experiment One were evaluated for efficacy in an oil blend containing 28% soy oil, 30% coconut oil, and 42% high oleic safflower oil. This blend was formulated to provide 1% of total energy as linolenic acid. As used herein and in the claims, the percentages of each component in an oil blend are understood to refer to the percent of the total weight of the oil blend.

Oil blend samples were treated with, and without, antioxidant/chelator and with ferrous sulfate/copper sulfate as a prooxidant. Samples were incubated in a continuously aerated oven at 75°-80° C .for 24 to 48 hrs. Aliquots were taken at 0, 24, and 48 hours for peroxide value analysis.

The efficacy of each antioxidant/chelator mixture was calculated as the difference in peroxide value from t=0 to t=24 hours and the difference in peroxide value from t=0 to t=48 hours. Table 3 presents peroxide value data for the combinations evaluated. The results demonstratethatalpha-tocopherol in combination with ascorbyl palmitate and soy lecithin is effective in protecting the oil blend from oxidation, during a 24 hr period. The 24 hr peroxide value was 0.0 meq/kg vs. a peroxide value of 106 meq/kg for the control. This mixture is efficacious with or without, beta carotene or citric acid. Similarly, beta carotene is effective in combination with ascorbyl palmitate and soy lecithin with, or without, alphatocopherol or citric acid. When the oxidation reaction is extended to 48 hrs, alpha tocopherol in combination with ascorbyl palmitate (2:1 molar ratio) and soy lecithin were antioxidative. The 48 hr peroxide value for this combination was 0.2 meq/kg vs. a value of 79.55 meq/kg for the control. Likewise, the mixture of beta carotene, ascorbyl palmitate and soy lecithin (0.2 meq/kg at 48 hr) is also protective.

TABLE 2

ANTIOXIDANT EFFECT AS PERCENT INHIBITION

| Run # | Ascorbyl Palmitate (ppm) | B. Carotene (ppm) | Tocopherol (ppm) | Citrate (ppm) | % Peroxide Inhibition |
|---|---|---|---|---|---|
| Control | 0 | 0 | 0 | 0 | 100 |
| 1 | 0 | 0 | 800 | 0 | 34 |
| 2 | 0 | 13 | 0 | 0 | 7.5 |
| 3 | 0 | 0 | 0 | 800 | 34 |
| 4 | 400 | 0 | 0 | 0 | 154 |
| 5 | 400 | 13 | 800 | 0 | 5.3 |
| 6 | 0 | 13 | 800 | 800 | 5.0 |
| 7 | 400 | 13 | 0 | 800 | 398 |
| 8 | 400 | 0 | 800 | 800 | 4.7 |
| 9 | 400 | 0 | 0 | 800 | 138 |
| 10 | 400 | 13 | 0 | 0 | 239 |
| 11 | 500 | 16 | 1000 | 1000 | 4.3 |
| 12 | 500 | 0 | 1000 | 0 | 0.7 |
| 13 | 250 | 8 | 1000 | 1000 | 11 |
| 14 | 500 | 8 | 500 | 1000 | 1.2 |
| 15 | 100 | 16 | 200 | 1000 | 3.1 |
| 16 | 0 | 0 | 1000 | 1000 | 17 |
| 17 | 0 | 16 | 1000 | 0 | 12 |

TABLE 3

EFFICACY OF NATURAL ANTIOXIDANTS AND A CHELATOR IN AN OIL BLEND CONTAINING 28% SOY OIL

| ASCORBYL PALMITATE (ppm) | BETA CAROTENE (ppm) | CITRATE (ppm) | ALPHA TOCOPHEROL (ppm) | SOY LECITHIN (mg/ml) | PEROXIDE VALUE (meq/kg) | | |
|---|---|---|---|---|---|---|---|
| | | | | | T = 0 | T = 24 hrs | T = 48 hrs |
| — | — | — | — | — | 1.1 | 106 | — |
| 3.9 | 0.15 | 15.2 | 9.0 | 2.0 | 0.0 | 0.0 | — |
| 3.9 | — | — | 9.0 | 2.0 | 0.0 | 0.0 | — |
| 3.9 | 0.15 | — | 2.1 | 2.0 | 0.0 | 0.0 | — |
| 3.9 | 0.15 | — | — | 2.0 | 0.0 | 0.0 | — |

TABLE 3-continued

EFFICACY OF NATURAL ANTIOXIDANTS AND A CHELATOR
IN AN OIL BLEND CONTAINING 28% SOY OIL

| ASCORBYL PALMITATE (ppm) | BETA CAROTENE (ppm) | CITRATE (ppm) | ALPHA TOCOPHEROL (ppm) | SOY LECITHIN (mg/ml) | PEROXIDE VALUE (meq/kg) | | |
|---|---|---|---|---|---|---|---|
| | | | | | T = 0 | T = 24 hrs | T = 48 hrs |
| 3.9 | — | 15.2 | 9.0 | 2.0 | 0.0 | 0.0 | — |
| 3.9 | — | — | 2.1 | 2.0 | 0.0 | 0.0 | — |
| — | 0.15 | 15.2 | 9.0 | 2.0 | 1.8 | 61.3 | — |
| — | — | — | 2.1 | — | — | 51.1 | — |
| — | — | — | — | — | 1.6 | 112 | 79.55 |
| 3.9 | 0.15 | — | 9.0 | 2.0 | 0.0 | 0.2 | 0.3 |
| 3.9 | — | — | 9.0 | 2.0 | 0.0 | 0.2 | 0.2 |
| 3.9 | 0.15 | — | — | 2.0 | 0.0 | 0.0 | 0.2 |
| — | 0.15 | — | 9.0 | 2.0 | 3.1 | 26.4 | 19.2 |

These preliminary results indicated that for this oil blend system the most consistently effective antioxidant/chelating agents are: beta-carotene and/or alpha-tocopherol, as long as ascorbyl palmitate and soy lecithin (phospholipid) are present. It should be noted that citrate may or may not be present for protection of the oil blend for up to 48 hours.

EXPERIMENT THREE

The initial chemical and organoleptic quality of the oils will have an effect on the sensory quality of the final spray dried product. Soy and canola oils are highly unsaturated oils and their stability can be affected by storage conditions. The loss of desirable qualities of these oils may be due to oxidation of the double bonds in the unsaturated fatty acids, hydrolysis of the ester linkages and flavor reversion. It is recommended that soybean oil be stored under nitrogen at a storage temperature of about 65°–110° F. to further minimize oxidation and maintain the quality of the oil. A dose-response study was run in both milk based and soy based powdered nutritional products for infants using oil blends containing between 0% and 40% soy oil. The milk based powder products referred to herein were substantially like SIMILAC ® with Iron, which is a product of Ross Laboratories, a division of Abbott Laboratories, Columbus, Ohio U.S.A. The soy based powder products referred to herein were substantially like ISOMIL ® which is a product of Ross Laboratories, a division of Abbott Laboratories, Columbus, Ohio U.S.A. The major differences between the experimental products and the commercially available products were the oil blends and antioxidant systems. Organoleptic evaluation of these batches, as presented in Table 4, confirmed that product rancidity increased as the percentage of soy oil was increased. Both the milk based and soy based powders containing 10% soy oil were determined to be of marginal quality at 0-time.

TABLE 4

OXIDATION OF MILK BASED PRODUCT

| Oil Blend | Peroxide (meq/kg) | Percent Oxygen (3 wk) | Oxidation Score (3 wk) | Percent Oxygen (3 mo.) | Oxidation Score (3 mo.) | Percent Oxygen (6 mo.) | Oxidation Score (6 mo.) | Moisture (%) |
|---|---|---|---|---|---|---|---|---|
| 50% Corn/50% Coc. | — | 0.2 | 0.0 | 0.3 | 0.0 | 0.4 | 0.0 | 1.73 |
| 10% Soy | — | 0.2 | 3.0 | 0.3 | 3.0 | 0.3 | 4.0 | 1.67 |
| 20% Soy | — | 0.2 | 4.0 | 0.2 | 4.0 | 0.3 | 4.0 | 1.29 |
| 30% Soy | — | 0.1 | 5.0 | 0.2 | 5.0 | 0.4 | 5.0 | 1.40 |
| 40% Soy | — | 0.1 | 5.0 | 0.2 | 5.0 | 0.3 | 5.0 | 1.77 |

A milk based powder was then manufactured with an experimental oil blend containing 28% soy oil, 30% coconut oil, and 42% high oleic safflower oil, as well as various antioxidant/chelating agent combinations shown to be efficacious in the oil blend system. The resulting products were evaluated for oxidative rancidity using organoleptic and peroxide value analyses. Data from these runs is presented in Table 5. Higher oxidation scores, determined via sensory analysis, indicate a greater level of rancidity in the product. Control products, containing no antioxidants, received acceptable oxidation scores of 1 and 2. Products containing two combinations, AT+AP+CA and AT+AP+CA+SL, received oxidation scores equal to or better than the control products. All other combinations evaluated had higher oxidation scores. Oxidation scores of 4 or greater are considered to be unacceptable. Oxidation scores of greater than 3.0 but less than 4.0 are acceptable but marginal. Oxidation scores of 3.0 or less are acceptable.

TABLE 5

OXIDATION SCORES FOR MILK BASED PRODUCT
HAVING AN OIL BLEND CIONTAINING 28% SOY OIL

| ASCORBYL PALMITATE (ppm) | BETA CAROTENE (ppm) | CITRATE (ppm) | TOCOPHEROL (ppm) | SOY LECITHIN (% oil blend) | OXIDATION SCORE |
|---|---|---|---|---|---|
| — | — | 800 | 400 | — | 3.5 |
| — | — | 800 | 800 | — | 4 |
| 400 | — | 800 | 800 | — | 0 |
| 400 | — | 800 | 800 | 2% | 1 |
| — | — | — | — | — | 1* |
| — | 13.0 | 1000 | — | 2% | 4 |
| — | 6.5 | 1000 | 500 | 2% | 4 |
| 500 | — | 1000 | 500 | 2% | 4.5 |

TABLE 5-continued

OXIDATION SCORES FOR MILK BASED PRODUCT
HAVING AN OIL BLEND CIONTAINING 28% SOY OIL

| ASCORBYL PALMITATE (ppm) | BETA CAROTENE (ppm) | CITRATE (ppm) | TOCOPHEROL (ppm) | SOY LECITHIN (% oil blend) | OXIDATION SCORE |
|---|---|---|---|---|---|
| 500 | 6.5 | 1000 | 1000 | 2% | 4.5 |
| — | — | — | — | — | 2* |

*CONTROL

Milk based products were made with an oil blend containing only 17% soy oil and various levels of either AT+AP+SL or BC+AP+SL. Oxidation scores for these products are presented in Table 6. All but one of these products was determined to have acceptable sensory quality at 0-time, with three products having very good scores of or 1. This shows that there are combinations of antioxidants and a chelating agent which are successful in preventing oxidation from occurring during processing and drying of a product in powder form.

TABLE 6

OXIDATION SCORES FOR MILK BASED PRODUCT
HAVING AN OIL BLEND CONTAINING 17% SOY OIL

| ASCORBYL PALMITATE (ppm) | BETA CAROTENE (ppm) | CITRATE (ppm) | ALPHA TOCOPHEROL (ppm) | SOY LECITHIN (% oil blend) | OXIDATION SCORE |
|---|---|---|---|---|---|
| — | — | — | — | — | 1 |
| 400 | — | — | 400 | 2 | 3 |
| 800 | — | — | 400 | 2 | 0 |
| 400 | — | — | 800 | 2 | 2 |
| 800 | — | — | 800 | 2 | 3 |
| — | — | — | — | — | 3.75 |
| 400 | 6.5 | — | — | 2 | 1 |
| 800 | 6.5 | — | — | 2 | 2.5 |
| 400 | 13 | — | — | 2 | 2 |
| 800 | 13 | — | — | 2 | 3 |

An experimental design was then developed which involved the manufacture of 25 batches of a milk based powdered nutritional product. The oil blend contained in this product consisted of 28% soy, 42% high oleic safflower, and 30% coconut oil. These batches contained varying combinations and levels of all five antioxidants and a chelating agent.

A blend of mixed tocopherols, predominantly delta and gamma tocopherol, was used in place of the alpha tocopherol because of their greater antioxidant capabilities. Concentrations of beta carotene, tocopherol, ascorbyl palmitate, and soy lecithin were based as ppm of the oil blend with the oil blend in a liquid state. The concentration of soy lecithin was based on percentage, by weight, of the oil blend with the oil blend in a liquid state. The concentration of citrate added as potassium citrate, was based as ppm of the amount of final product in a powdered form. Three levels of each antioxidant and the chelating agent were evaluated. These levels were:

| | | | |
|---|---|---|---|
| Beta carotene (ppm) | 0 | 7 | 13 |
| Mixed tocopherol (ppm) | 0 | 500 | 1000 |
| Ascorbyl palmitate (ppm) | 0 | 400 | 800 |
| Soy lecithin (%) | 0 | 1 | 2 |
| Citrate (ppm) | 0 | 1000 | 2000 |

The experimental design, showing the combinations and concentrations of each variable used per batch, is presented in Table 7. The design was completed in five Pilot Plant runs or blocks, with each block consisting of five batches.

TABLE 7

EXPERIMENTAL DESIGN FOR EVALUATION OF ANTI-
OXIDANT AND CHELATING AGENT COMBINATIONS

| Batch No. | Ascorbyl Palmitate (ppm) | Beta Carotene (ppm) | Tocopherol (ppm) | Citrate (ppm) | Soy Lecithin (% oil blend) |
|---|---|---|---|---|---|
| 1 | 0 | 0 | 1000 | 1000 | 1 |
| 2 | 800 | 0 | 1000 | 0 | 0 |
| 3 | 0 | 0 | 0 | 2000 | 2 |
| 4 | 400 | 0 | 0 | 1000 | 2 |
| 5 | 800 | 0 | 0 | 2000 | 0 |
| 6 | 0 | 0 | 0 | 2000 | 2 |
| 7 | 0 | 13 | 0 | 0 | 0 |
| 8 | 800 | 13 | 1000 | 2000 | 2 |
| 9 | 400 | 7 | 500 | 0 | 1 |
| 10 | 0 | 13 | 1000 | 2000 | 0 |
| *11 | 0 | 0 | 0 | 0 | 0 |
| 12 | 800 | 13 | 0 | 0 | 0 |
| 13 | 0 | 13 | 1000 | 0 | 0 |
| 14 | 0 | 13 | 1000 | 2000 | 2 |
| 15 | 800 | 0 | 1000 | 2000 | 2 |
| 16 | 400 | 13 | 0 | 2000 | 1 |
| 17 | 0 | 0 | 1000 | 2000 | 0 |
| 18 | 800 | 13 | 1000 | 0 | 2 |
| 19 | 800 | 0 | 0 | 0 | 1 |
| 20 | 800 | 7 | 1000 | 2000 | 0 |
| 21 | 0 | 0 | 1000 | 0 | 2 |
| 22 | 0 | 7 | 0 | 2000 | 0 |
| 23 | 400 | 13 | 1000 | 0 | 1 |
| 24 | 800 | 13 | 0 | 0 | 2 |
| 25 | 0 | 0 | 500 | 1000 | 1 |

*CONTROL

During manufacturing of the products, the beta carotene, tocopherol, ascorbyl palmitate, and soy lecithin were added to the oil blend prior to mixing the oil blend with the other ingredients. Citrate was added via a potassium citrate solution, which was added to each batch (if required by the experimental design) after the oil blend has been combined with other sources of nutrition, such as protein and carbohydrates.

Products manufactured as part of the experimental design of Table 7 were analyzed after three weeks for basic product composition, % oxygen, peroxide value, and flavor (oxidation score). The results are presented in Table 8 and show that three week oxidation scores ranged from 0 to 5. Off-notes of flavor as a result of oxidation exhibited in these products were beany (raw), cardboardy, and painty. Seventeen of the twenty-five batches had acceptable flavor scores. Oxidation scores of greater than 3.0 were considered to be unacceptable in evaluating these products. In general, batches which had higher peroxide values also exhibited a higher oxidation score. There is no apparent correlation between the percent oxygen in the can and the oxidation.

TABLE 8

RESULTS FROM EXPERIMENTAL DESIGN OF TABLE 7 FOR MILK BASED PRODUCT

| Batch No. | PEROXIDE VALUE (meg/kg) | PERCENT OXYGEN (3 wk.) | OXIDATION SCORE (3 wk.) | PERCENT OXYGEN (3 mo.) | OXIDATION SCORE (3 mo.) |
|---|---|---|---|---|---|
| 1 | 0.00 | 0.5 | 2.0 | 0.1 | 2.5 |
| 2 | 0.00 | 0.6 | 0.0 | 0.1 | 1.0 |
| 3 | 0.00 | 0.6 | 1.0 | 0.3 | 1.0 |
| 4 | 0.00 | 0.6 | 0.0 | 0.1 | 1.0 |
| 5 | 0.00 | 0.6 | 0.0 | 0.0 | 1.0 |
| 6 | 3.01 | 0.7 | 4.0 | 0.2 | 3.5 |
| 7 | 6.51 | 0.5 | 5.0 | 0.2 | 3.8 |
| 8 | 0.00 | 1.0 | 1.0 | 0.2 | 3.0 |
| 9 | 0.00 | 1.2 | 2.0 | 0.2 | 2.0 |
| 10 | 4.37 | 1.1 | 4.0 | 0.2 | 4.0 |
| 11 | 0.90 | 1.1 | 0.5 | 0.1 | 0.0 |
| 12 | 0.00 | 1.3 | 0.0 | 0.1 | 0.0 |
| 13 | 1.34 | 0.7 | 4.0 | 0.0 | 4.0 |
| 14 | 2.98 | 0.6 | 4.0 | 0.0 | 4.0 |
| 15 | 1.59 | 0.9 | 5.0 | 0.1 | 1.0 |
| 16 | 0.01 | 1.1 | 0.0 | 0.0 | 0.5 |
| 17 | 0.64 | 1.0 | 4.0 | 0.1 | 4.0 |
| 18 | 0.28 | 1.1 | 1.5 | 0.1 | 2.0 |
| 19 | 0.16 | 1.5 | 0.0 | 0.1 | 0.0 |
| 20 | 0.26 | 1.6 | 1.0 | 0.0 | 2.0 |
| 21 | 0.55 | 0.4 | 2.0 | 0.2 | 2.5 |
| 22 | 0.56 | 0.3 | 0.0 | 0.2 | 2.0 |
| 23 | 0.14 | 0.7 | 1.0 | 0.2 | 2.5 |
| 24 | 0.00 | 0.9 | 1.0 | 0.2 | 1.5 |
| 25 | 0.47 | 0.5 | 3.0 | 0.2 | 3.0 |

Based on data obtained from the 25 batches manufactured according to the experimental design of Table 7 statistical analysis allowed for the prediction of oxidation scores for 4,320 different combinations and levels of antioxidants and the chelating agent. The optimal combination, statistically, was 12 ppm beta carotene, 800 ppm ascorbyl palmitate, and 2000 ppm citrate. Combinations other than this also yielded oxidation scores of 0. The seven best combinations all contained beta carotene from 10-14 ppm, ascorbyl palmitate from 600-800 ppm, and citrate from 1600-2000 ppm. The other six "best combinations" are: (a) 800 ppm ascorbyl palmitate(AP), 14 ppm beta carotene(BC) and 200 ppm citrate(C); (b) 800 ppm (AP), 10 ppm (BC) and 2000 ppm C; (c) 600 ppm AP, 10 ppm BC and 2000 ppm C; (d) 600 ppm AP, 12 ppm BC and 2000 ppm C; (e) 800 ppm AP, 10 ppm BC and 1600 ppm C;and (f) 800 ppm AP, 12 ppm BC and 1600 ppm C.

Tocopherol was also shown to be an effective antioxidant, however most systems with tocopherol which resulted in 0 oxidation scores also contained beta carotene. All effective combinations contained ascorbyl palmitate, indicating this component is essential in minimizing oxidation. In all cases, oxidation scores increased as the level of soy lecithin increased.

However, acceptable products were manufactured using 400-800 ppm of ascorbyl palmitate, 8-14 ppm of beta carotene, 1200-2000 ppm of citrate (exclusive of the counter-ion, e. g. in potassium citrate a much larger amount of potassium citrate is used in order to get the desired level of citrate). Mixed tocopherols at levels in the range of 800-1000 ppm, used either in addition to the other ingredients, or in place of the beta carotene, also has utility in the practice of the present invention. However, it is believed that depending upon the formulation and intended nutritional attributes of any particular powdered nutritional product the concentrations of the ingredients of the antioxidant system may be in these ranges: beta carotene 6-20 ppm; ascorbyl palmitate 400-1200 ppm; citrate greater than 1000, preferably 1600-2500 ppm; and mixed tocopherols 200-1200 ppm.

Once again, it is to be remembered that as used herein and in the claims the ppm of ascorbyl palmitate, beta carotene and mixed tocopherols is expressed with respect to the weight of the oil blend alone, when the oil is in liquid form, while the ppm of citrate is expressed with respect to the total weight of the product in a powdered form.

Based on the results of the statistical analysis, the combination of 12 ppm beta carotene, 800 ppm ascorbyl palmitate and 2000 ppm citrate was chosen for subsequent experimental work. Citrate was added in the form of potassium citrate. A decision was made to evaluate an oil blend for powdered nutritional products containing 1.5% of the fatty acids as linolenic acid. This requires that the oil blend be comprised of a minimum of 12% soy oil. The oil blend chosen for evaluation contained 50% corn oil, 38% coconut oil, and 12% soy oil. Throughout the remainder of this experiment (Tables 9-12) the various products all contained the antioxidant system set forth in tis paragraph in combination with an oil blend of 28% soy oil, 42% high oleic safflower oil, nd 30% coconut oil.

A packing study was conducted on a milk based product, a soy based product, and a whey protein product, all in powdered form, in order to evaluate the effect of prolonged exposure to ambient conditions on the product's nutritional and organoleptic quality. The whey protein products/powders referred to herein were substantially like SIMILAC ® PM 60/40 which is a product of Ross Laboratories, a division of Abbott Laboratories, Columbus, Ohio U.S.A. The major differences between the experimental whey-based product and the commercially available whey-based product were the oil blend and the antioxidant system. This study was designed to simulate powder packing procedures, where product is held in bulk storage for up to 10 days after spray drying before being packed into containers for retail sale.

Samples of each product were taken at 0, 2, 4, 6, 8, 11 and 13 days after spray drying, and prior to packing in containers suitable for retail sale. The samples were submitted for Vitamin A, E, and C contents, Peroxide Value and subjected to Sensory Evaluation. The analytical data from the study is presented in Table 9.

late consumer storage of a product after the retail package is opened as well as to monitor nutrient degradation in the product. Current storage recommendations state that usage of a product such as a pediatric nutritional product in powdered form should occur within one month of opening of the container.

Four randomly selected cans of each product were opened and equal size samples were taken from each can. The samples from the four cans were combined and mixed to assure uniformity. Once samples were taken, the cans were sealed with plastic lids and stored undisturbed at room temperature. Every week for five weeks, samples were composited and analyzed for Vitamin A, E, and C contents, Peroxide Value and subjected to Sensory Evaluation.

The analytical results from the open can study are

TABLE 9

Analytical Data from Powder Packing Study Conducted on Pediatric Powders Containing Soy Oil and Antioxidants

| Product | Nutrient | Day 0 | Day 4 | Day 6 | Day 8 | Day 11 | Day 13 |
|---|---|---|---|---|---|---|---|
| Milk Based | Vitamin A (IU/L) | 2700 | 2750 | 2820 | 2440 | 2800 | 2830 |
| Soy Based | | 2760 | 2720 | 2730 | 2720 | 2750 | 2730 |
| Whey Protein | | 2640 | 2650 | 2890 | 2660 | 2720 | 2710 |
| Milk Based | Vitamin E (IU/L) | 22.3 | 22.5 | 22.6 | 20.5 | 22.4 | 23.0 |
| Soy Based | | 21.0 | 21.0 | 20.8 | 21.2 | 21.2 | 21.2 |
| Whey Protein | | 21.7 | 21.6 | 21.7 | 21.6 | 22.3 | 22.9 |
| Milk Based | Vitamin C (mg/l) | 160.7 | 164.4 | 156.1 | 157.2 | 154.4 | 157.0 |
| Soy Based | | 176.6 | 170.4 | 268.4 | 170.8 | 166.6 | 170.0 |
| Whey Protein | | 133.3 | 117.3 | 129.7 | 124.2 | 127.6 | 128.2 |
| Milk Based | Peroxide Value | ND | ND | ND | ND | ND | ND |
| Soy Based | | ND | ND | ND | ND | ND | ND |
| Whey Protein | | ND | ND | ND | ND | ND | ND |
| Milk Based | Oxidation Score | 0 | 0 | 0 | 0 | 0 | 0 |
| Soy Based | | 0 | 0 | 0 | 0 | 0 | 0 |
| Whey Protein | | 0 | 0 | 0 | 0 | 0 | 0 |

ND = NOT DETECTABLE

The products extributed acceptable nutrient quality through 13 days. Vitamin levels were virtually unchanged in all products. Peroxide formation was not detectable in any of the products. Sensory evaluation oxidation scores were 0 at every interval for each product, an indication that no oxidative rancidity could be detected in the flavor.

Products packed in sealed containers on day 0 and day 11 were stored for 30 days prior to being used in an open container study. This study was designed to simupresented in Tables 10-12. All products exhibited acceptable nutrient quality through five weeks. Vitamin A recoveries in the milk based product were approximately 95% of initial recoveries in powder packed on day 0 and day 11 after five weeks storage. Vitamin E recoveries were 98% and 90% of initial recoveries in powder packed on day 0 and day 11, respectively. After five weeks, Vitamin C recoveries were approximately 89% of initial recoveries in powder packed on both days.

TABLE 10

Analytical Results from Open Can Study Conducted on Milk Based Powder Containing Soy Oil and Antioxidants

| | Vitamin A (IU/L) | Vitamin E (IU/L) | Vitamin C (mg/L) | Peroxide Value (meg/kg oil) | Oxidation Score |
|---|---|---|---|---|---|
| Specifications | 2200-4000 | 20.0-26.4 | 96 minimum | — | |
| Packed on Day 0 | | | | | |
| Initial | 2600 | 22.2 | 158.2 | ND | 0 |
| Week 1 | 2610 | 22.5 | 161.8 | ND | 1 |
| Week 2 | 2580 | 22.2 | 141.8 | ND | 1 |
| Week 3 | 2580 | 21.4 | 139.3 | 1.9 | 2 |
| Week 4 | 2430 | 21.9 | 145.3 | 4.6 | 2.5 |
| Week 5 | 2532 | 21.9 | 138.3 | 6.2 | 3 |
| Packed on Day 11 | | | | | |
| Initial | 2670 | 22.0 | 154.9 | ND | 0.5 |
| Week 1 | 2720 | 21.8 | 141.8 | ND | 0 |
| Week 2 | 2730 | 22.5 | 148.2 | 1.9 | 0 |
| Week 3 | 2680 | 22.5 | 142.5 | 1.9 | 1 |
| Week 4 | 2460 | 20.6 | 135.6 | 5.6 | 2 |
| Week 5 | 2513 | 19.9* | 138.3 | 9.0 | 2.5 |

ND = Detected but not quantifiable

TABLE 11

Analytical Results from Open Can Study Conducted on
Soy Based Powder Containing Soy Oil and Antioxidants

| | Vitamin A (IU/L) | Vitamin E (IU/L) | Vitamin C (mg/L) | Peroxide Value (meq/kg oil) | Oxidation Score |
|---|---|---|---|---|---|
| Specifications | 2200–3800 | 20.0–26.0 | 110 minimum | — | |
| Packed on Day 0 | | | | | |
| Initial | 2660 | 22.2 | 182.5 | ND | 0 |
| Week 1 | 2610 | 22.5 | 181.7 | ND | 1 |
| Week 2 | 2560 | 21.1 | 166.9 | ND | 1 |
| Week 3 | 3520 | 20.3 | 159.6 | ND | 2 |
| Week 4 | 2510 | 21.1 | 160.9 | ND | 2.5 |
| Week 5 | 2504 | 22.5 | 151.2 | ND | 3 |
| Packed on Day 11 | | | | | |
| Initial | 2610 | 20.7 | 174.6 | ND | 2 |
| Week 1 | 2650 | 21.0 | 187.8 | ND | 0 |
| Week 2 | 2610 | 21.1 | 163.2 | ND | 0 |
| Week 3 | 2580 | 20.0 | 153.8 | ND | 0 |
| Week 4 | 2530 | 21.8 | 150.0 | ND | 3.5 |
| Week 5 | 2650 | 21.1 | 147.1 | ND | 3.5 |

ND = Detected but not quantifiable

TABLE 12

Analytical Results from Open Can Study Conducted on
Whey Protein Based Powder Containing Soy Oil and Antioxidants

| | Vitamin A (IU/L) | Vitamin E (IU/L) | Vitamin C (mg/L) | Peroxide Value (meq/kg oil) | Oxidation Score |
|---|---|---|---|---|---|
| Specifications | 2200–4000 | 17.0–28.0 | 90 minimum | — | |
| Packed on Day 0 | | | | | |
| Initial | 2580 | 21.7 | 130.3 | ND | 0 |
| Week 1 | 2500 | 21.6 | 125.6 | ND | 1 |
| Week 2 | 2530 | 20.8 | 120.6 | 1.5 | 1 |
| Week 3 | 2530 | 20.9 | 112.9 | 2.0 | 2 |
| Week 4 | 2460 | 21.7 | 112.6 | 6.2 | 2.5 |
| Week 5 | 2454 | 21.2 | 122.7 | 7.8 | 3 |
| Packed on Day 11 | | | | | |
| Initial | 2600 | 21.6 | 124.3 | ND | 0.5 |
| Week 1 | 2560 | 21.9 | 127.1 | 2.3 | 0 |
| Week 2 | 2610 | 21.1 | 116.8 | 4.4 | 0 |
| Week 3 | 2580 | 21.5 | 112.9 | 5.4 | 0 |
| Week 4 | 2380 | 21.9 | 143.1 | 7.8 | 1 |
| Week 5 | 2400 | 21.1 | 121.0 | 7.1 | 2 |

ND = Detected but not quantifiable

Vitamin A and E recoveries in the soy based powder were over 94% of initial recoveries in powder packed initially and in powder held 11 days prior to packing. Vitamin C recoveries were approximately 84% of initial recoveries in powder packed on both days.

The whey protein based powder exhibited very little nutrient degradation after five weeks of storage in powder packed on day 0 and day 11. Vitamin A recoveries were 92% and 95% of initial results in powder packed initially and on day 11, respectively. Vitamin E recoveries were 98% in powder packed on both days. Vitamin C recoveries ranged from 94–97% of initial results.

Peroxide formation in the milk based powder packed on day 0 was undetectable after two weeks of open storage. Peroxides were detected after three weeks and increased each week thereafter, reaching a maximum of 6.2 after five weeks. Peroxide formation in powder packed on day 11 was detected after two weeks and increased weekly, reaching a maximum of 9.0 after five weeks storage.

Peroxides were detected in whey protein based powder packed on day 0 after two weeks of open storage. The peroxide value increased weekly and was 7.8 after five weeks. Powder packed on day 11 had detectable peroxides after the first week of open storage. After five weeks, the peroxide value of day 11 packed powder was 7.1.

Peroxide values in soy based powder were detected, but not quantifiable after five weeks of open storage.

Sensory evaluation results for the various powders are shown in Tables 10–12. Oxidation scores of 4 and above are considered unacceptable. All of the products exhibited acceptable organoleptic quality after five weeks of open storage. Milk based powder packed on day 0 was very slightly oxidized after three weeks. The oxidation was moderate after five weeks; however, the product was evaluated as acceptable. Oxidation was undetected in powder packed on day 11 until the third week of open storage. This powder exhibited slight to moderate oxidation after five weeks.

Soy based powder packed on day 0 exhibited no oxidative flavor notes until the third week of open storage. The oxidation score after five weeks storage reached a maximum of 3, which is considered moderately oxidized, yet acceptable product. Powder packed on day 11 was rate 0 after three weeks, indicating that no oxidation could be detected in the flavor. Moderate oxidation was detected in the powder after five weeks.

Generally, as peroxide values increased, oxidation scores also increased. This trend can be seen in milk based and soy based powder. Whey protein based powder, however, had peroxide values as high as 7.8, while oxidation scores were 0 after four weeks of open storage. Previous research suggests that whey protein, one of the protein sources in whey protein based powder may have a masking effect on oxidative flavor notes. This could explain why the oxidation scores are much better than the peroxide values would suggest. Very slight to slight oxidation was detected in the product after five weeks.

From the results of the powder packing and open can study, the antioxidant system appears to be effective in minimizing oxidation in powdered products. The nutrient quality of the products remained consistent and acceptable through thirteen days of packing. Vitamin losses were minimal through five weeks of open storage. Peroxide values increased slightly in milk based powder and whey protein based powder, but were undetectable in soy based powder. Organoleptic quality was acceptable in all products throughout the study.

A decision was made that the antioxidant system which had been optimized for an oil blend of 28% soy oil, 42% high oleic safflower oil, and 30% coconut oil would also be efficacious for an oil blend containing 12% soy oil, 50% corn oil and 38% coconut oil. This antioxidant system included 12 ppm beta carotene, 800 ppm ascorbyl palmitate, and 2000 ppm citrate. Batches containing 12% soy oil were manufactured with no optimization work being performed on this system.

EXPERIMENT FOUR

A decision was made to evaluate the efficacy of the preferred antioxidant system in a milk-based powdered nutritional product having an oil blend containing soy oil, 42% high oleic safflower oil, 29% coconut oil and 1% high docosahexaenoic acid (DHA) marine oil. (The source of the marine oil was tuna.) These products were manufactured using the same procedures described in the previously described experiments. The oxidation scores and peroxide values, measured after the products had been stored in sealed cans for about one week (products were packed in cans immediately following manufacture), are presented in Table 13. A product made without any antioxidation system had an oxidation score of 3, which is marginal, and a moderately fishy taste was detectable in the product. A product made using an antioxidant system of 800 ppm ascorbyl palmitate, 12 ppm beta carotene, and 2,000 ppm citrate (in the form of potassium citrate) had an oxidation score of 1, which is considered to be good, and had only a very slight fishy taste. It was decided to also evaluate an antioxidant system comprising 800 ppm ascorbyl palmitate, 2,000 ppm citrate (in the form of potassium citrate) and 800 ppm tocopherol (in the form of mixed tocopherols available under the trade name Tenox GT from Eastman Chemical Products, Inc.). This last product also had an oxidation score of 1 and only a slightly fishy taste. The peroxide values of each of the products was so low as to be not detectable. As a result of this experiment it may be concluded that the antioxidant systems of the present invention are suitable for use in powdered nutritional products having an oil blend which contains marine oil.

TABLE 13

OXIDATION SCORES AND PEROXIDE VALUES FOR MILK BASED POWDER CONTAINING 28% OF THE OIL BLEND AS SOY OIL AND 1% MARINE OIL USING VARIOUS ANTIOXIDANTS

| Ascorbyl Palmitate (ppm) | B. Carotene (ppm) | Citrate (ppm) | Tocopherol (ppm) | Oxidation Score | Peroxide Value (meg/kg) |
|---|---|---|---|---|---|
| — | — | — | — | 3 | ND |
| 800 | 12 | 2000 | — | 1 | ND |
| 800 | — | 2000 | 800 | 1 | ND |

ND = Not Detectable

While certain representative embodiments and details have been presented for the purpose of describing the invention, it will be apparent to those skilled in the art that various changes and modifications may be made therein without departing from the spirit or scope of the invention.

We claim:

1. A nutritional product in powdered form comprising protein, fat, carbohydrates, minerals, vitamins, trace elements and antioxidants, wherein said fat is an oil blend containing at least one ingredient selected from the group consisting of soy oil and marine oil, and wherein said oil blend is stabilized by said antioxidants which comprise about 400-1200 ppm of ascorbyl palmitate, about 6-20 ppm beta-carotene, and at least 1000 ppm of citrate, the ppm of ascorbyl palmitate and beta carotene being expressed with respect to said oil blend when the oil blend is in a liquid state, and the ppm of citrate being expressed with respect to the total weight of the product when the product is in a powdered form.

2. A nutritional product in powdered form according to claim 1 wherein the antioxidant system further comprises about 200-1200 ppm of mixed tocoperols, the ppm of the mixed tocopherols being expressed with respect to the oil blend when the oil blend is in a liquid state.

3. A nutritional product is powdered form according to claim 1 wherein the antioxidant system comprises about 600-800 ppm of ascorbyl palmitate, about 10-14 ppm of beta carotene and about 1600-2500 ppm of citrate.

4. A nutritional product in powdered form according to claim 3 wherein the antioxidant system further comprises about 200-1200 ppm of mixed tocopherols,, the ppm of the mixed tocopherols being expressed with respect to the oil blend when the oil blend is in a liquid state.

5. A nutritional product in powdered form comprising protein, fat, carbohydrates, minerals, vitamins, trace elements and antioxidants, wherein said fat is an oil blend containing at least one ingredient selected from the group consisting of soy oil and marine oil, and wherein said oil blend is stabilized by said antioxidants which comprise about 400-1200 ppm of ascorbyl palmitate, about 200-1200 ppm of mixed tocopherols, and at least 1000 ppm of citrate, the ppm of ascorbyl palmitate and mixed tocopherols being expressed with respect to said oil blend when the oil blend is in a liquid state, and the ppm of citrate being expressed with respect to the total weight of the product when the product is in a powdered form.

6. A nutritional product is powdered form according to claim 5 wherein the antioxidant system comprises about 600-800 ppm of ascorbyl palmitate,, about 800-1000 ppm of mixed tocopherols and about 1600-2500 ppm of citrate.

7. A nutritional product in powdered form for human infants comprising protein, fat, carbohydrates, minerals, vitamins, trace elements and antioxidants, wherein said fat is an oil blend containing at least one ingredient selected from the group consisting of soy oil, coconut oil and corn oil, and wherein said oil blend is stabilized by said antioxidants which comprise about 600–1000 ppm of ascorbyl palmitate, about 8–14 ppm beta carotene, and at least 1000 ppm of citrate, the ppm of ascorbyl palmitate and beta carotene being expressed with respect to said oil blend when the oil blend is in a liquid state, and the ppm of citrate being expressed with respect to he total weight of the product when the product is in a powdered form.

8. A nutritional product in powdered form for human infants comprising protein, fat, carbohydrates, minerals, vitamins, trace elements and antioxidants, wherein said fat is an oil blend comprising by weight about 12% soy oil and about 38% coconut oil and about 50% corn oil, and wherein said oil blend is stabilized by said antioxidants which comprises about 800 ppm of ascorbyl palmitate, about 12 ppm beta-carotene, and at least 2000 ppm of citrate, the ppm of ascorbyl palmitate and beta carotene being expressed with respect to said oil blend when the oil blend is in a liquid state, and the ppm of citrate being expressed with respect to the total weight of the product when the product is in a powdered form.

9. A method of manufacturing a nutritional product in powdered form comprising the steps of:
   (a) preparing a liquid oil blend which contains (i) at least one ingredient selected from the group consisting of soy oil and marine oil, (ii) about 400–1200 ppm of ascorbyl palmitate, and (iii) about 6–20 ppm of beta carotene, the ppm of ascorbyl palmitate and beta carotene being expressed with respect to the oil blend when the oil blend is in a liquid state;
   (b) combining said liquid oil blend with a protein source and a carbohydrate source which are also in liquid form in order to form a product blend;
   (c) combining at least 1000 ppm of citrate with said product blend, the ppm of citrate being expressed with respect to the total weight of the product when the product is in powdered form; and
   (d) converting the product of step (c) into a powdered form.

10. A method of manufacturing a nutritional product in powdered form according to claim 9 wherein step (a) further comprises adding about 200–1200 ppm of mixed tocopherols to said oil blend, the ppm of mixed tocopherols being expressed with respect to the oil blend when the oil blend is in a liquid state.

11. A method of manufacturing a nutritional product in powdered form according to claim 10 wherein in step (d) the product of step (c) is converted into powdered form by spray drying.

12. A method of manufacturing a nutritional product in powdered form according to claim 9 wherein in step (a) the liquid oil blend comprises about 600–1000 ppm ascorbyl palmitate and about 8–14 ppm beta carotene.

13. A method of manufacturing a nutritional product in powdered form according to claim 12 wherein step (a) further comprises adding about 800–1000 ppm of mixed tocopherols to said oil blend, the ppm of mixed tocopherols being expressed with respect to the oil blend when the oil blend is in a liquid state.

14. A method of manufacturing a nutritional product in powdered form according to claim 12 wherein in step (d) the product of step (c) is converted into powdered form by spray drying.

15. A method of manufacturing a nutritional product in powdered form according to claim 9 wherein in step (d) the product of step (c) is converted into powdered form by spray drying.

16. A method of manufacturing a nutritional product in powdered form according to claim 13 wherein in step (d) the product of step (c) is converted into powdered form by spray drying.

17. A method of manufacturing a nutritional product in powdered form comprising the steps of:
   (a) preparing a liquid oil blend which contains (i) at least one ingredient selected from the group consisting of soy oil and marine oil, (ii) about 400–1200 ppm of ascorbyl palmitate, and (iii) about 200–1200 ppm of mixed tocopherols, the ppm of ascorbyl palmitate and mixed tocopherols being expressed with respect to the oil blend when the oil blend is in a liquid state;
   (b) combining said liquid oil blend with a protein source and a carbohydrate source which are also in liquid form in order to form a product blend;
   (c) combining at least 1000 ppm of citrate with said product blend, the ppm of citrate being expressed with respect to the total weight of the product when the product is in powdered form; and
   (d) converting the product of step (c) into a powdered form.

18. A method of manufacturing a nutritional product in powdered form according to claim 17 wherein in step (d) the product of step (c) is converted into powdered form by spray drying.

* * * * *

UNITED STATES PATENT AND TRADEMARK OFFICE
CERTIFICATE OF CORRECTION

PATENT NO. : 5,234,702

DATED : August 10, 1993

INVENTOR(S) : G. Katz, M. Guzman-Harty

It is certified that error appears in the above-indentified patent and that said Letters Patent is hereby corrected as shown below:

Column 1, Line 33, "Carboncarbon" should be --carbon-carbon--

Column 1, Line 39, "freeradical" should be --free-radical--

Column 2, Line 43, "oflinolenic" should be --of Linolenic--

Column 4, Line 17, "45.C ." should be --45°C .--

Column 5, Line 7, "betacarotene" should be --beta carotene--

Column 6, Line 36, "demonstratethatalpha-tocopherol" should be - demonstrate that alpha-tocopherol--

Column 6, Line 44, "alphatocopherol" should be --alpha-tocopherol--

Column 8, Line 47, "I" should be --1--.

Column 9, Line 17, "of or 1." should be --of 0 or 1 --

Column 18, Line 39, "is" should be --in--

Column 18, Line 64, "is" should be --in--

UNITED STATES PATENT AND TRADEMARK OFFICE
CERTIFICATE OF CORRECTION

PATENT NO. : 5,234,702

DATED : August 10, 1993

INVENTOR(S) : G. Katz, M. Guzmna-Harty

It is certified that error appears in the above-indentified patent and that said Letters Patent is hereby corrected as shown below:

Column 19, Line 14, "he" should be --the--

Signed and Sealed this

Twenty-ninth Day of March, 1994

Attest:

BRUCE LEHMAN

Attesting Officer        Commissioner of Patents and Trademarks